US009924834B2

(12) United States Patent
Joffe

(10) Patent No.: US 9,924,834 B2
(45) Date of Patent: Mar. 27, 2018

(54) EXPANDED POLYSTYRENE COOLER WITH SLIDE-LOCKING LID

(71) Applicant: TCP Reliable, Inc., Edison, NJ (US)

(72) Inventor: David L. Joffe, Owings Mills, MD (US)

(73) Assignee: TCP RELIABLE, INC., Edison, NJ (US)

( * ) Notice: Subject to any disclaimer, the term of this patent is extended or adjusted under 35 U.S.C. 154(b) by 128 days.

(21) Appl. No.: 14/991,052

(22) Filed: Jan. 8, 2016

(65) Prior Publication Data

US 2017/0196404 A1 Jul. 13, 2017

(51) Int. Cl.
*A47J 41/00* (2006.01)
*B65D 50/06* (2006.01)
*B65D 43/12* (2006.01)
*B65D 43/02* (2006.01)
*B65D 81/38* (2006.01)

(52) U.S. Cl.
CPC ............ *A47J 41/00* (2013.01); *B65D 43/022* (2013.01); *B65D 43/12* (2013.01); *B65D 50/06* (2013.01); *B65D 81/3816* (2013.01); *B65D 2215/04* (2013.01)

(58) Field of Classification Search
CPC .... B65D 81/3816; B65D 43/12; B65D 50/06; B65D 81/3813; B65D 43/022; B65D 43/021; B65D 2215/04; B65D 43/20; B65D 39/00
USPC .............. 220/801, 345.1, 288, 293, 298–302
See application file for complete search history.

(56) References Cited

U.S. PATENT DOCUMENTS

| 44,753 | A | * | 10/1864 | Sherwood | B60K 15/0406 220/301 |
|---|---|---|---|---|---|
| 1,684,412 | A | * | 9/1928 | Reiner | F01P 11/0214 220/300 |
| 3,057,508 | A | * | 10/1962 | Kimbrough, Jr. | A45C 11/20 220/318 |
| 4,048,050 | A | * | 9/1977 | Hillman | B65D 50/045 206/1.5 |
| 4,721,205 | A | * | 1/1988 | Burt | F41C 33/06 206/1.5 |
| 4,807,759 | A | * | 2/1989 | Castner | H05K 5/03 206/1.5 |
| 5,129,538 | A | * | 7/1992 | Bennett | G07G 1/0027 220/315 |

(Continued)

*Primary Examiner* — Jeffrey Allen
*Assistant Examiner* — Jennifer Castriotta
(74) *Attorney, Agent, or Firm* — Eric P. Mirbel, JD, LLM

(57) ABSTRACT

Disclosed is an expanded polystyrene cooler having a body, a lid and a lid locking mechanism, said lid locking mechanism including a transversely-extending ridge near the perimeter of the underside surface of the lid, with the ridge surrounding the majority of said underside surface. There are at least two opposed flanges on the underside surface having extended portions extending towards the edge of the lid, as well as at least two horizontal channels on the inner surface of the body, each channel including an opening at one end facing the flanges and configured to receive one of the flanges and including a section having an extension towards the inside of the body, said section configured to rest upon the flange extended portion and lock the lid with the body, when the flange is positioned below the extension, whereby the lid is in place atop the cooler body.

11 Claims, 9 Drawing Sheets

(56) References Cited

U.S. PATENT DOCUMENTS

| | | | | |
|---|---|---|---|---|
| 5,251,776 A | * | 10/1993 | Morgan, Jr. | F16J 13/065 |
| | | | | 215/307 |
| 6,364,096 B1 | * | 4/2002 | De Baets | B65D 21/0219 |
| | | | | 206/1.5 |
| 7,275,642 B2 | * | 10/2007 | Yuhara | A45D 40/222 |
| | | | | 206/1.5 |
| 2011/0226784 A1 | * | 9/2011 | Boerhave | B65D 81/3876 |
| | | | | 220/592.2 |

\* cited by examiner

EXPANDED POLYSTYRENE COOLER WITH SLIDE-LOCKING LID

BACKGROUND

Expanded polystyrene ("foam") coolers are inexpensive, lightweight, waterproof, and provide good insulation for the contents. They are popular with consumers for cooling food and beverages over short periods; such as day trips. However, these inexpensive foam coolers generally have a loose fitting lid, held in place by friction. The brittle nature of the foam material prevents using a tight friction fit for the lid, as that would likely cause breakage at the contact points between the lid and the cooler body. As a result, when a cooler is turned upside down, the lid almost always falls off, especially if the cooler has relatively heavy liquid contents—such as food, water, ice or other beverages. Moreover, the foam is so light, that even a breeze (common when coolers are used outside and particularly at the beach) or quick movement of the cooler (as takes place during transport) can cause the lid to dislodge or come flying off.

Use of conventional metal or hard plastic hinges or locking mechanisms is often not practical with foam, due to its brittle nature. It cannot take and/or keep screws or rivets in place in normal use. Some designs of external (non-molded) locking mechanisms for coolers are known, but they add cost to a locking mechanism which can be molded.

SUMMARY

The invention relates to an expanded polystyrene cooler with a lid having top surface and a transversely-extending ridge on the underside surface surrounding the majority (but not all) of the underside surface near its perimeter. There are at least two opposed flanges extending away from each other on the outer side of the ridge. The body of the cooler has, on its inner surface near the cooler opening where the lid is received, at least two horizontal channels. The channels are preferably open along the side facing inwardly (though that side may be sealed) and include a widened, upwardly facing opening at one end. The upwardly facing openings are each configured to receive a flange, when the lid is in place. All these parts are molded as a unit with the lid, or with the cooler body, as applicable.

The flanges have a curved surface or a secondary extension extending towards the edge of the underside surface, and designed to slide along the horizontal channels, and at the end of their travel, fit tightly into the region of the channels distal from the upwardly facing openings. By sliding the lid along the channels to where the flanges are in locking position, the lid is locked in place in the cooler body, and cannot come off, other than by breaking the flanges or the inwardly extending portions of channels.

All portions of the cooler are molded, i.e., the ridge and the flanges are molded in forming the lid and the channels are molded in forming the cooler body.

The Invention will now be described with reference to the drawings.

DETAILED DESCRIPTION

Figure 1:
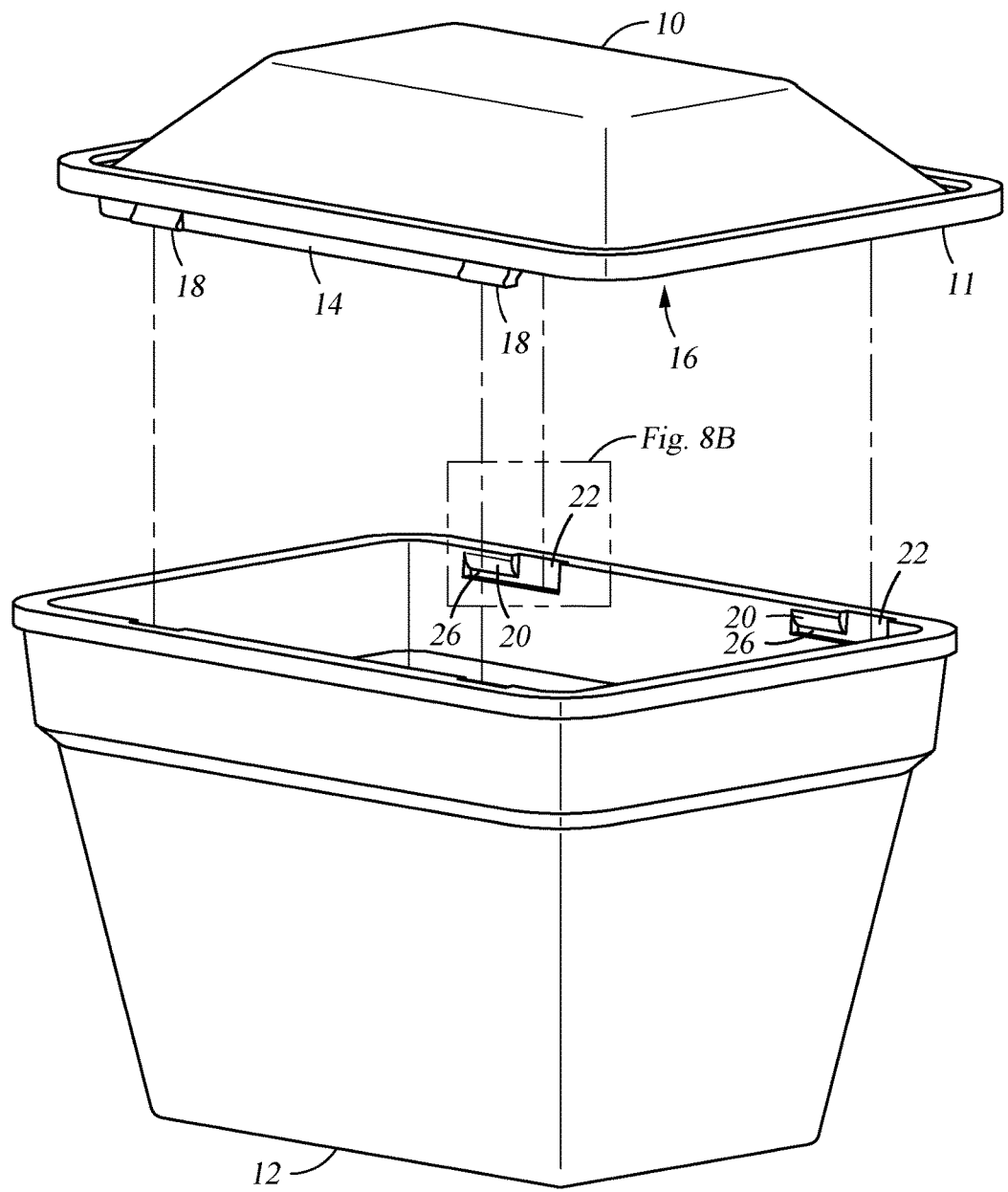
FIG. 1 is an elevational view of the cooler body and lid.
Figure 2:
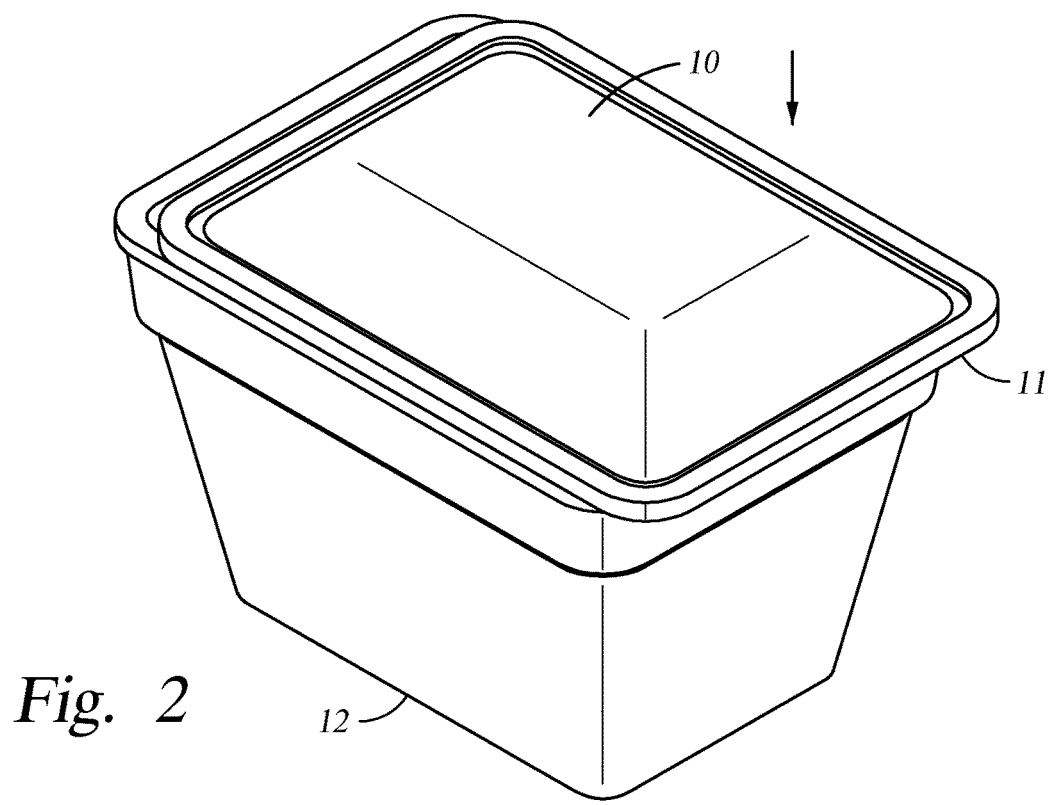
FIG. 2 is a plan view of the cooler body and the lid in the unlocked positioned.

Referring to FIGS. 1 and 2, lid 10 is in position to slide and lock in place atop cooler body 12. It can be seen that some of the underside of lid 10 without ridge 14, portion 16, is positioned over a region outside cooler 12. More particularly, all of one end of lid 10, end 11, is positioned outside cooler 12 in FIGS. 1 and 2. Some of such portion 16 is positioned over cooler 12 in FIGS. 1 and 2.

Figure 3:
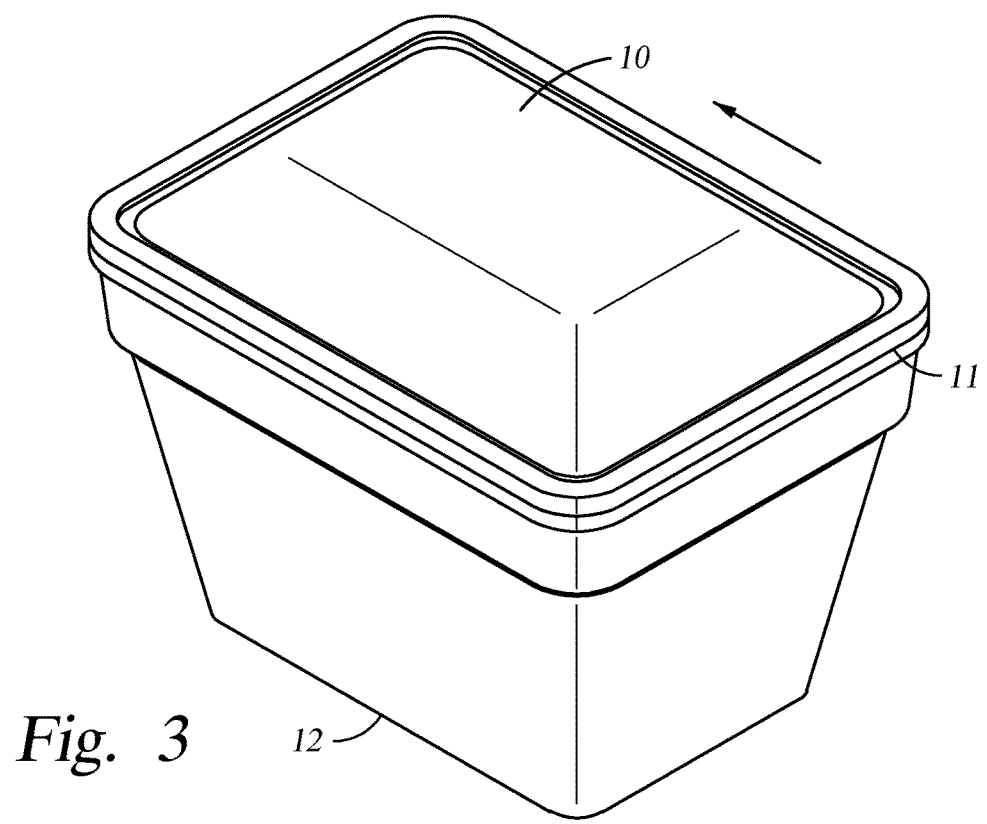
FIG. 3 is a plan view of the cooler body and the lid in the locked positioned.
Figure 4:
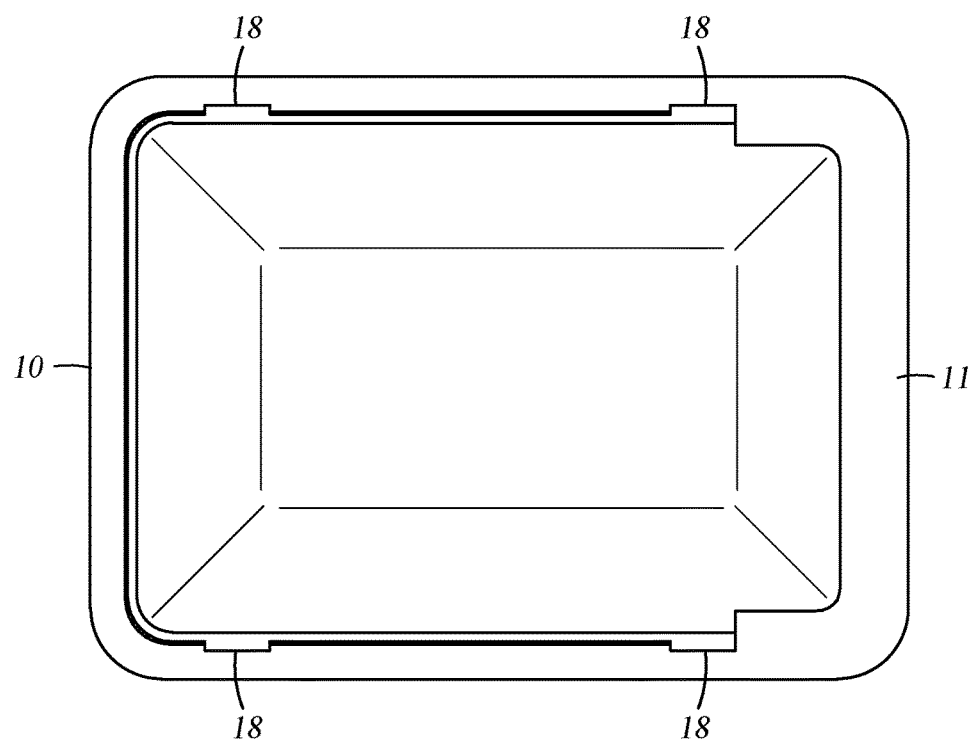
FIG. 4 is a plan view of the underside surface of the lid.
Figure 5:
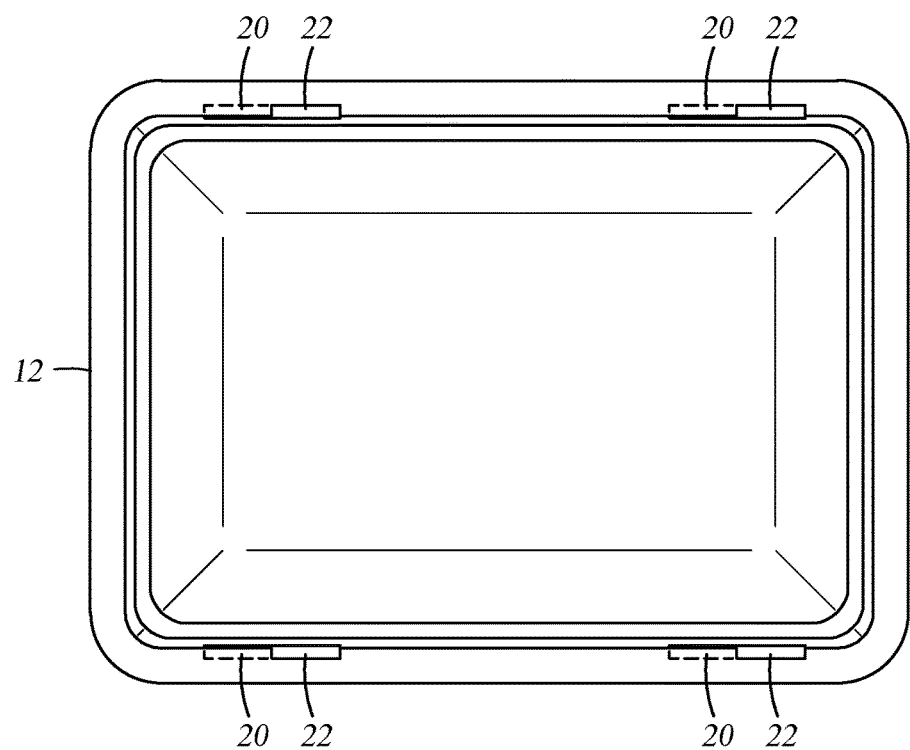
FIG. 5 is a plan view of the opening of the cooler body and the uppermost surface.
Figure 6:
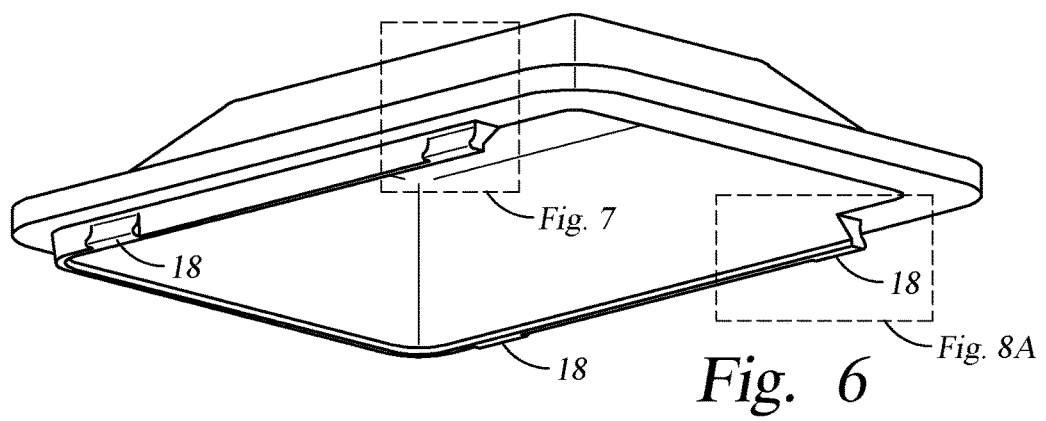
FIG. 6 is an elevational view of the lid showing the underside.
Figure 7:
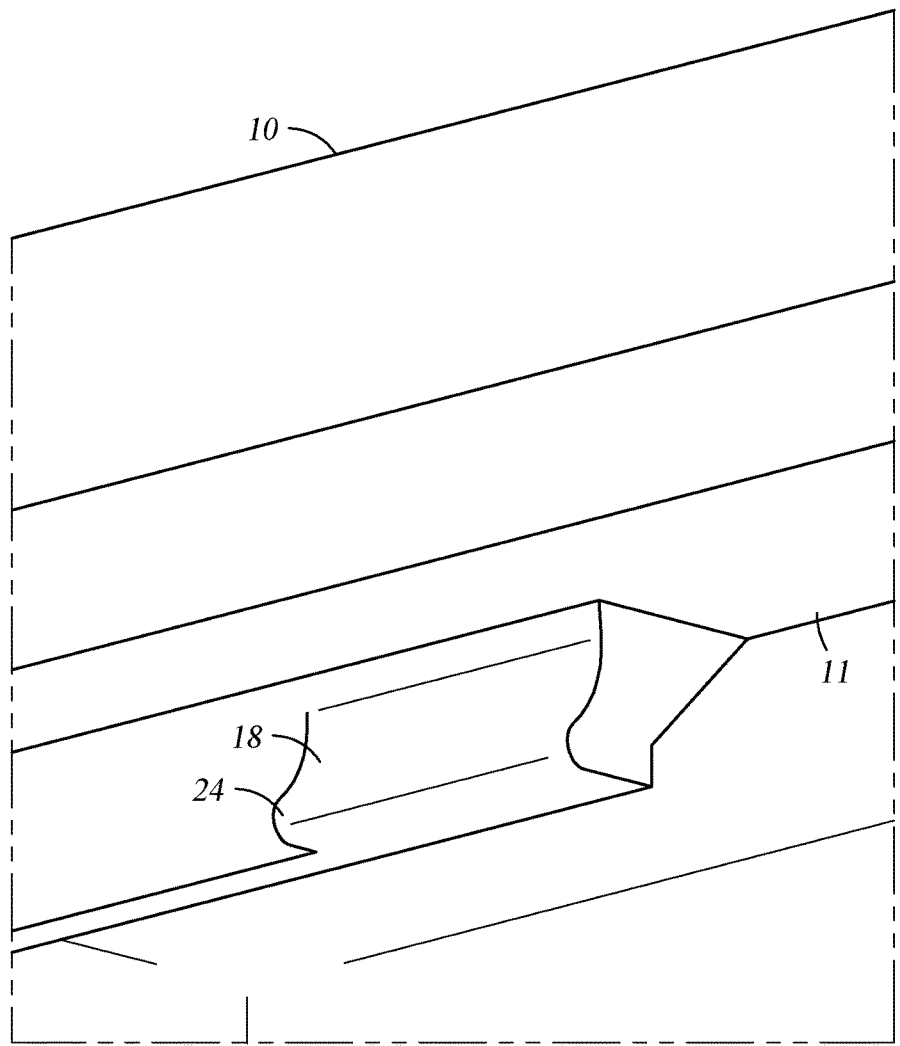
FIG. 7 is an expanded view of the section marked FIG. 7 in FIG. 6.
Figure 8A:
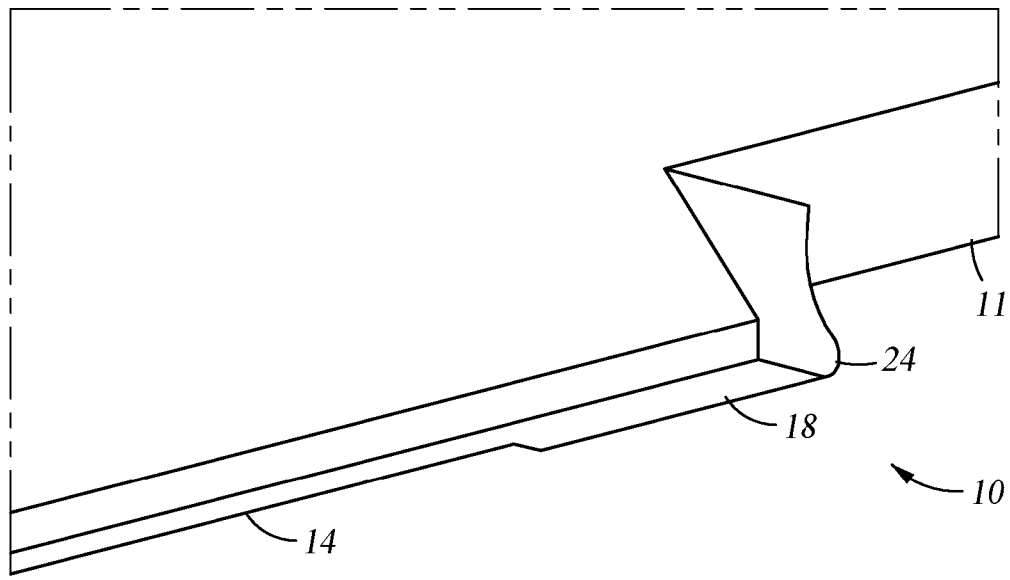
FIG. 8A is an expanded view of the section marked FIG. 8A in FIG. 6, and also showing the mating channel in the cooler body.
Figure 8B:
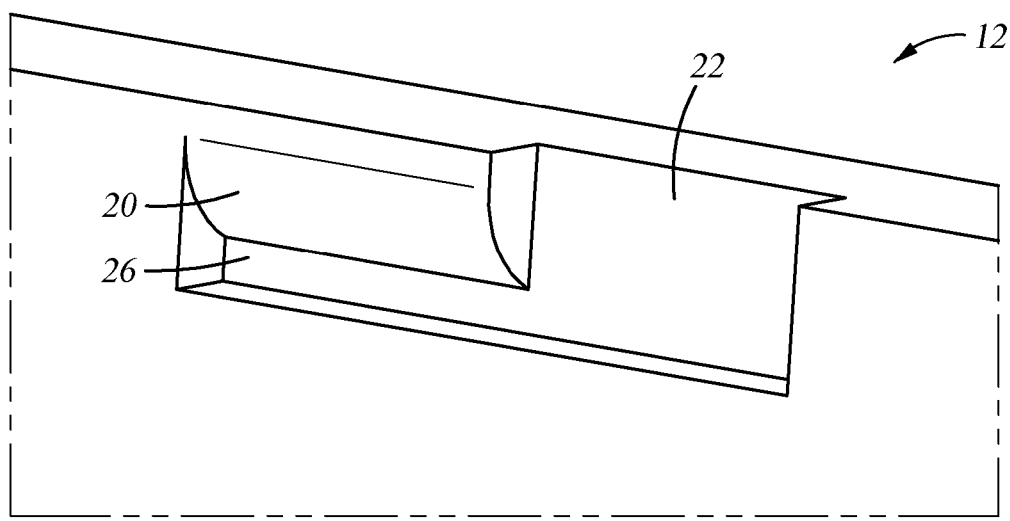
FIG. 8B is an expanded view of the section marked FIG. 8B in FIG. 9.
Figure 9:
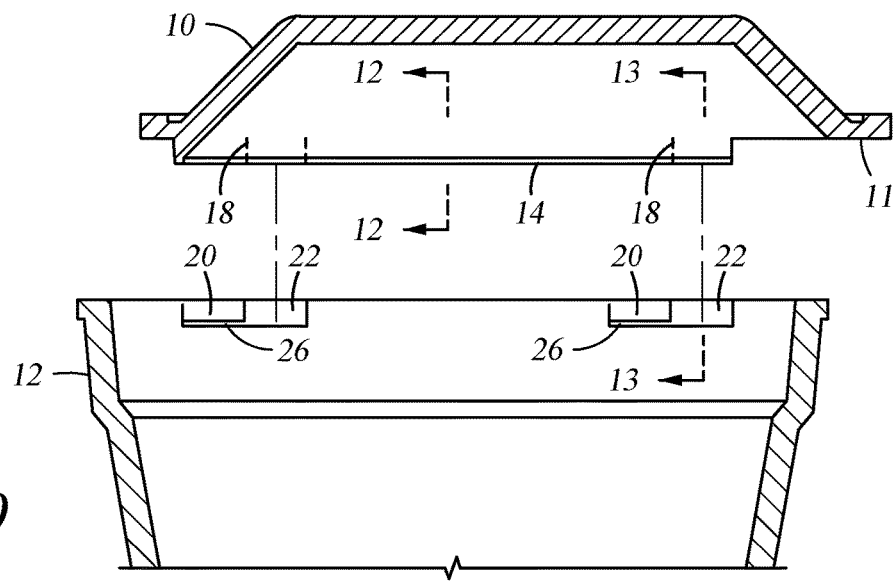
FIG. 9 is a sectional view of the cooler with the lid in position to mate with the channels in the cooler body.
Figure 10:
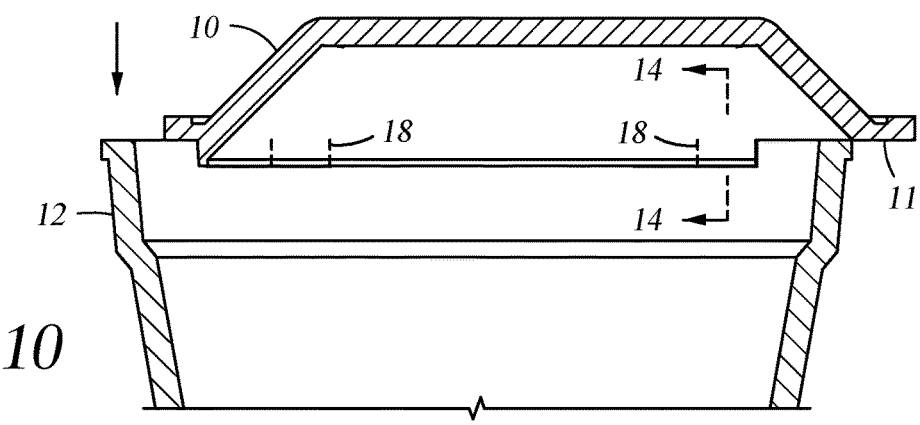
FIG. 10 is a sectional view of the cooler with the lid in position as in FIG. 2.
Figure 11:
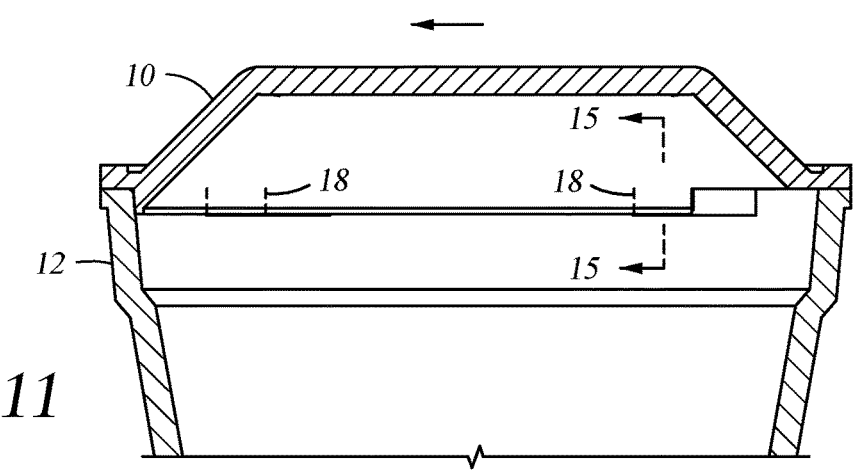
FIG. 11 is a sectional view of the cooler with the lid in position as in FIG. 3.
Figure 12:
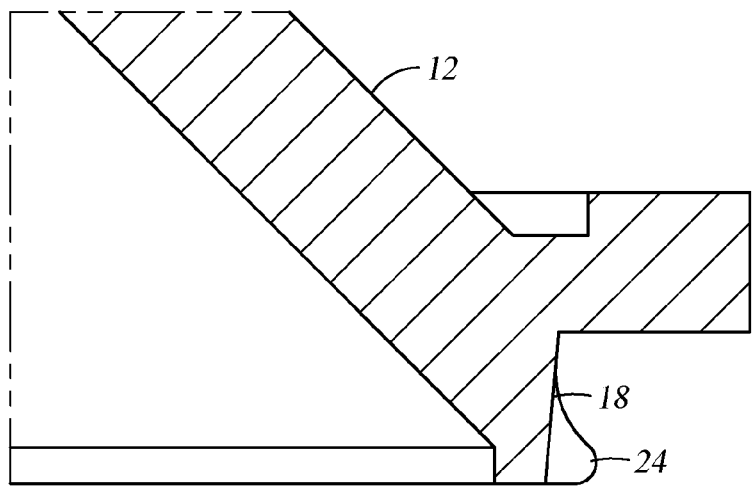
FIG. 12 is a sectional view of the lid taken along the lines 12-12 in FIG. 9.
Figure 13:
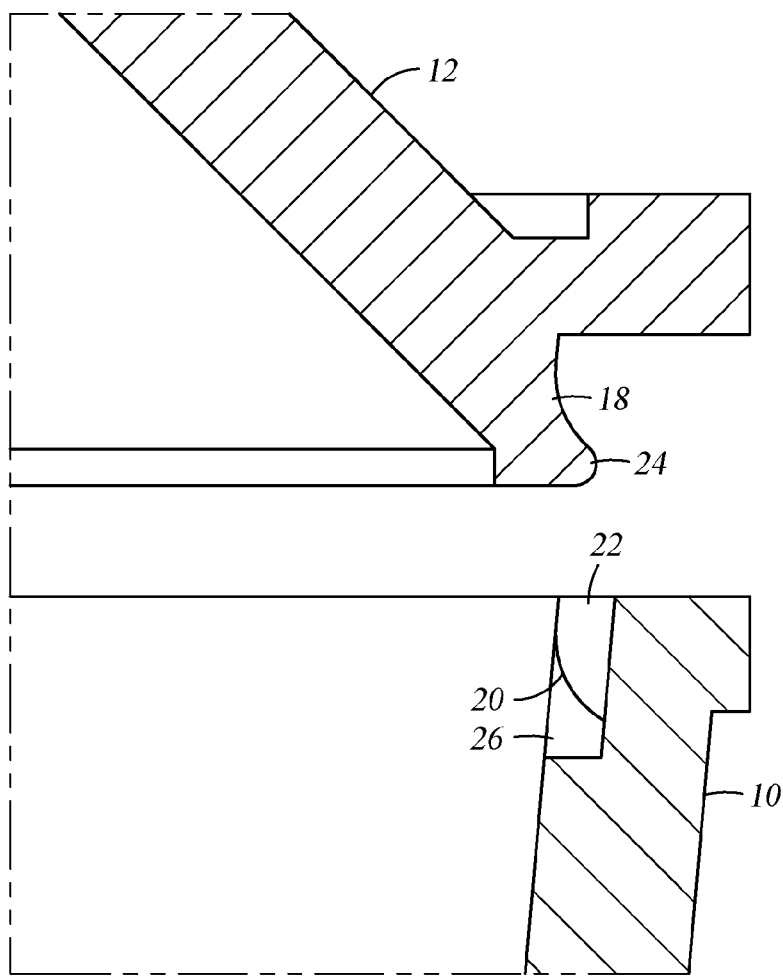
FIG. 13 is a sectional view of the lid and cooler body taken along the lines 13-13 in FIG. 9.
Figure 14:
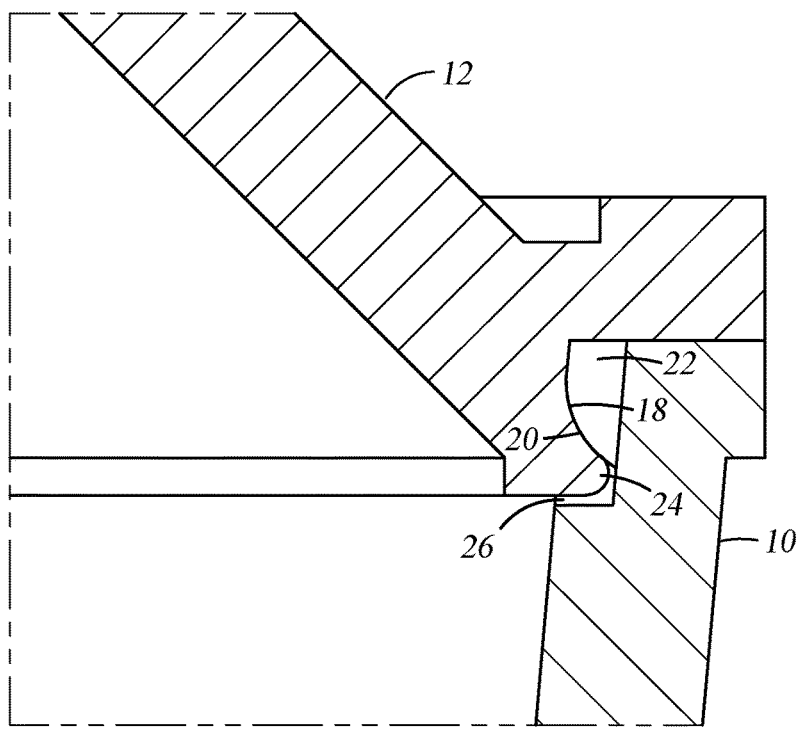
FIG. 14 is a sectional view of the lid in place in the cooler body taken along the lines 14-14 in FIG. 10.
Figure 15:
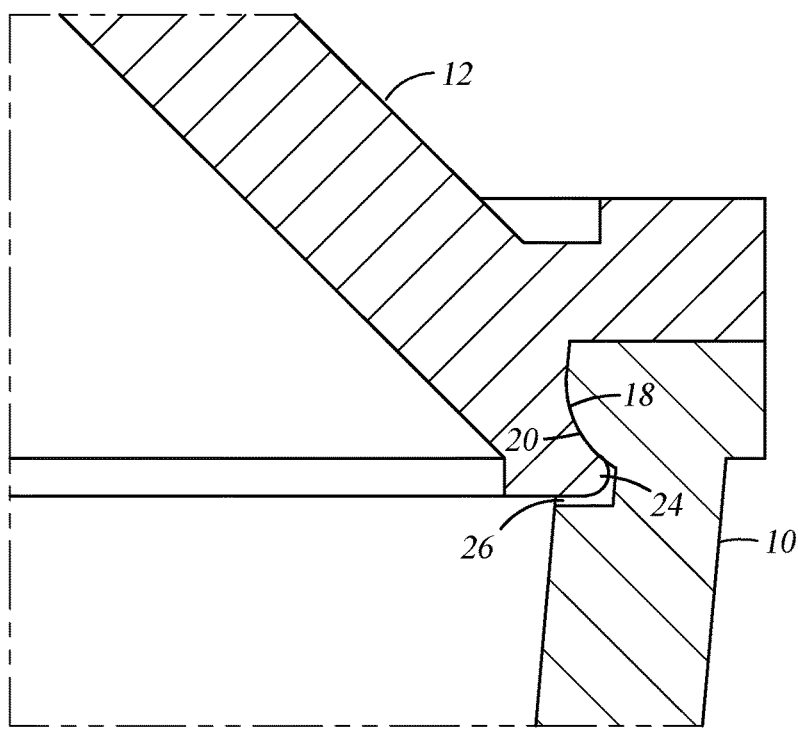
FIG. 15 is a sectional view of the lid in place in the cooler body taken along the lines 15-15 in FIG. 11.

Outwardly extending flanges 18 in lid 10 slide down and fit into the upwardly facing openings 22 in channels 20, leaving lid 10 positioned as in FIGS. 2 and 10. Lid 10 is then pushed away from end 11 (in the direction of the arrow in FIG. 3) such that flanges 18 slide along channels 20 to their end, leaving lid 10 positioned as in FIG. 3. In this position, the outwardly-extending portions 24 of flanges 18 (FIG. 6) are locked beneath the inwardly-extending portions 26 of channels 20 (FIG. 8B). When the lid 10 is in the locked position, the interaction of portions 24 and 26 lock lid 10 and cooler body 12 together, against forces acting to displace lid 10 vertically (including outward pressure from the cooler body 12 contents against lid 10).

Figure 16:
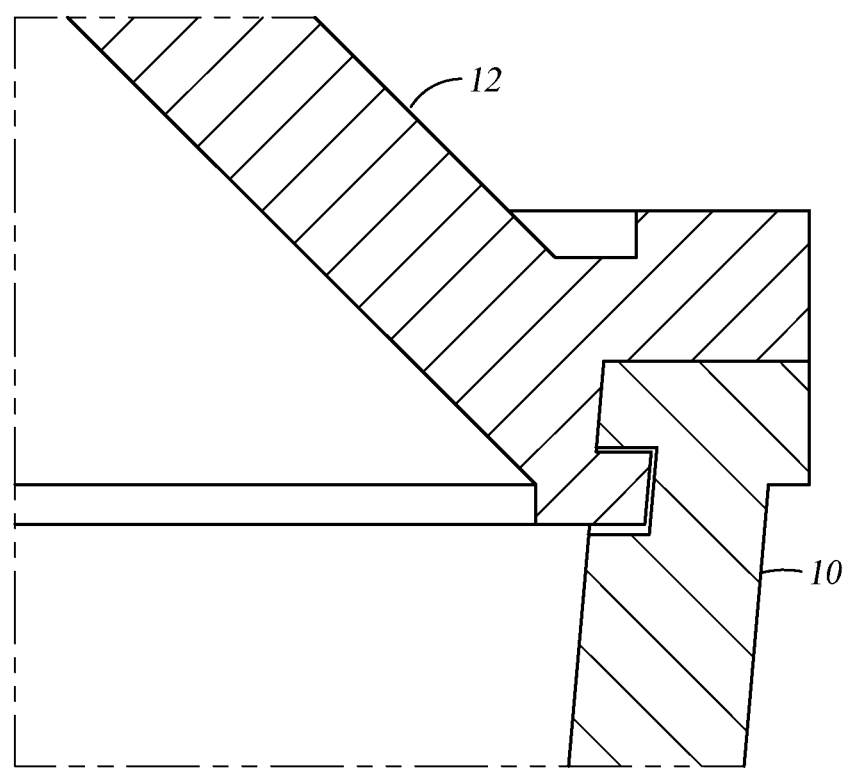
FIG. 16 is a sectional view of another embodiment of flanges 18 and channels 20, similar to the view in FIG. 15.

In the embodiment of lid 10 and cooler 12 shown in FIGS. 1-15, the portions 24 and 26 are oppositely curved, to fit tightly and interact along a substantial surface area. In other embodiments, the curved surface is not necessary, and the channel 20 can merely have a section above an outwardly extending flange 24 to lock it into place. One such example, where the mating portions of lid 10 and cooler 12 are squared instead of curved, is shown in FIG. 16. It should also be understood that although four flanges 18 and channels 20 are in the preferred embodiment, any combination of two or more interacting flanges and channels on opposite sides of the lid 10 and cooler body 12 will adequately lock lid 10 into place atop cooler body 12.

It should be understood that the foregoing description and embodiments are intended to merely illustrate and not limit the scope of the invention. Other embodiments, modifications, variations and equivalents of the invention are apparent to those skilled in the art and are also within the scope of the invention, which is only described and limited in the claims which follow, and not elsewhere.

What is claimed is:

1. An expanded polystyrene cooler molded to have a body with an inner surface on four sides and a bottom thereof, and an open top, and a lid having an underside surface, an edge around its perimeter and a lid locking mechanism, said lid locking mechanism comprising:
   a transversely-extending ridge near the perimeter of the underside surface of the lid, said ridge surrounding the majority of said underside surface but not extending around one end of the underside surface of the lid;
   at least two molded opposed flanges extending transverse to the underside surface of the lid, said flanges having extended portions extending from one side of the flanges parallel to said underside surface and towards the edge of the lid; and
   at least two horizontal channels on the inner surface of the body, each channel including an opening at one end facing upwardly and configured to receive one of the flanges and including a section having an extension towards the inside of the body, said section configured to rest upon the flange extended portion and lock the lid with the body, when the flange extended portion is positioned below the extension whereby the lid is in place atop the cooler body.

2. The expanded polystyrene cooler of claim 1 wherein the flanges' extended portions are part of a concave surface of the flanges.

3. The expanded polystyrene cooler of claim 2 wherein the section of the horizontal channels having the extension is convex and mates with the concave surface of the flanges.

4. The expanded polystyrene cooler of claim 1 wherein the flanges' extended portions are substantially rectangular in shape.

5. The expanded polystyrene cooler of claim 4 wherein the section of the horizontal channels having the extension mates with the extended portions of the flanges.

6. The expanded polystyrene cooler of claim 1 wherein the ridge rests inside the inner surface of the cooler body when the lid is in place atop the cooler body.

7. The expanded polystyrene cooler of claim 6 wherein to seal the cooler body, the lid is positioned such that said one end of the underside surface of the lid is positioned outside the opening in the cooler body, and the flanges are slid down into the opening in the channels, and then the lid is slid such said one end is positioned over the cooler body.

8. The expanded polystyrene cooler of claim 1 wherein the flanges' extended portions extend further towards the edge of the lid than the outermost side of the ridge.

9. The expanded polystyrene cooler of claim 1 wherein the lid, the flanges and the ridge are molded as a unit.

10. The expanded polystyrene cooler of claim 1 wherein the cooler body and the horizontal channels are molded as unit.

11. The expanded polystyrene cooler of claim 1 wherein there are four flanges and four horizontal channels.

* * * * *